United States Patent [19]

Chi

[11] 4,151,487
[45] Apr. 24, 1979

[54] LASER CAVITY STRUCTURE

[76] Inventor: Chang Hwi Chi, 1634 Aspenwall Rd., Westlake Village, Calif. 91361

[21] Appl. No.: 832,377

[22] Filed: Sep. 12, 1977

[51] Int. Cl.² ............................................. H01S 3/081
[52] U.S. Cl. ............................. 331/94.5 C; 350/294; 350/299
[58] Field of Search .................. 331/94.5 C, 94.5 D; 350/294, 299

[56] References Cited
U.S. PATENT DOCUMENTS
3,681,709  8/1972  Brown .............................. 331/94.5 C Primary Examiner—William L. Sikes

[57] ABSTRACT

A laser cavity structure in which the laser gain medium is located outside the resonant cavity and optically connected to the cavity through a hole in one of the cavity mirror by means of an optical arrangement located external of the resonant cavity.

11 Claims, 28 Drawing Figures

INPUT WAVEFRONT TILT = 1 MILLIRAD

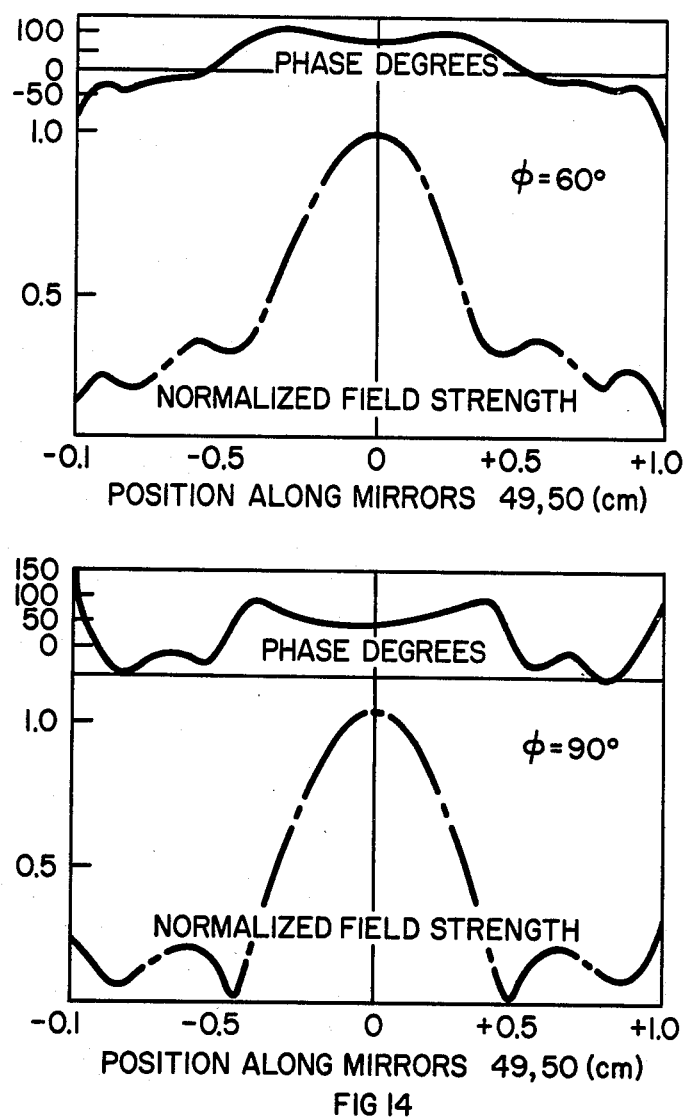
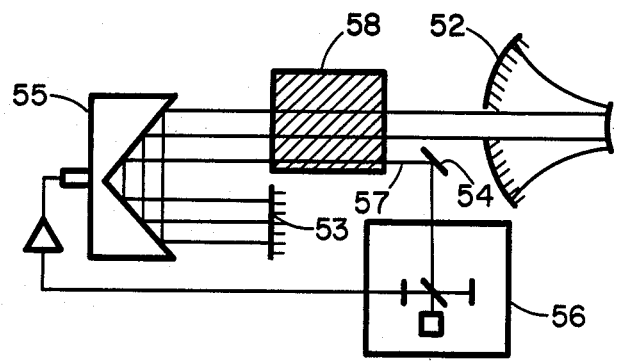
FIG 14
FIG 15

LASER CAVITY STRUCTURE

SUMMARY

This invention is directed to a laser cavity structure, wherein the gain medium is located outside said resonant cavity and yet optically connected to said cavity through the relay optics means and a hole in one of the cavity mirrors. In said cavity structure, the geometry of cavity is not constrained by the size of gain medium, and the characteristics of the resulting laser beam is less sensitive to the random refluctation of the gain medium, and to the jitter and misalignment of the relay optics connecting said gain medium to said cavity.

This invention is directed to applying said cavity structure to the laser pointing means in which the beam expander is the laser resonator, and the laser gain medium having no resonator cavity of its own is optically connected to the resonator through the relay optics.

The output beam of said pointing means is less sensitive to the ramdom fluctuation of gain medium, and to the jitter and misalignment of relay optics than that of prior art.

This invention is also directed to applying said cavity structure to the mode locker laser, within the higher power laser having a long gain medium dimension can be made to produce higher pulse rate than the prior art.

Another object is to provide the single mode operation of the laser which has no constraints on the maximum allowable length of the gain medium and whose output beam quality is less sensitive to the random fluctuation of gain than that of the prior art.

STATEMENT OF OBJECTS

The object of this invention is to provide a laser cavity structure, wherein the dimension of cavity is not constrained by the dimensions of gain medium its mounting and cooling accessories, and the output beam characteristics of said cavity is less sensitive to the random fluctuation of said gain medium than those of prior art.

Another object is to provide the laser pointing means which demands less stringent requirements of the stabilization control bandwidth and dynamic range and produces output beam whose characteristics are less sensitive to the misalignment, jitter and aberration of relay optics than the laser pointing means of prior art.

Yet another object is to provide a mode-locked laser structure, wherein the cavity length, the longitudinal mode spacing, and the laser pulse rate are not constrained by the dimension of gain medium, its mounting and cooling accessories.

This invention is also directed to applying said cavity structure to the single longitudinal mode laser, wherein the single axial mode is attainable regardless of the size of the gain medium.

DESCRIPTION OF THE DRAWINGS

FIG. 13 and FIG. 14 shows the resonant mode when the mirror 49 of FIG. 8 has displacement error.

FIG. 15 shows means to reduce the displacement error to the desired level.

1. PRINCIPLE OF THE DEVICE

1.1 Interaction of the Gain Medium and Resonator Cavity in Prior Art

A laser consists of two elements: the gain medium that is supplying the necessary power to sustain the laser oscillation, and the resonator cavity converting the random fluction of photons into a well phased coherent laser beam.

The properties of laser beam such as the beam mode shape, number of modes and spectral purity are primarily determined by the geometry of resonator cavity.

Figure 1:
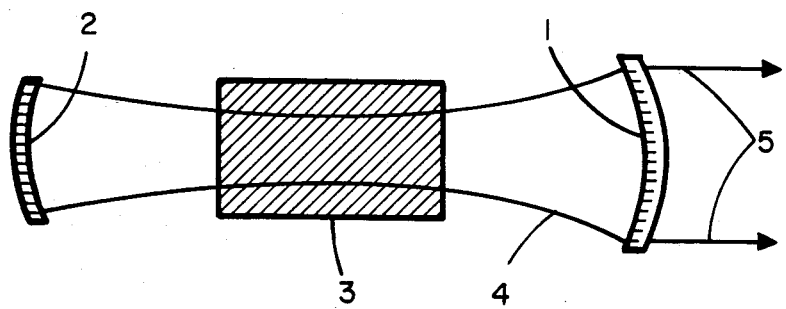
FIG. 1 is a typical laser cavity of prior art.

In a laser system of prior are shown in FIG. 1, the operation of the resonator cavity is adversely affected by the random fluctuation in the properties of gain medium. In such a configuration, the gain medium 3 is enclosed by the cavity mirrors 1 and 2; and as the beam mode 4 bounces repeatedly between the resonator mirrors passing through the gain medium 3 in each trip, the phase and amplitude of the beam mode is affected by the inhomogeneity and random fluctuation in the gain and the index of refraction of the gain medium 3. Consequently, the output laser beam 5 suffers from the random fluctuation and degraded coherence, and the characteristics of the output beam 5 cannot be predicted with a high degree of confidence especially in high power lasers.

In high power lasers, these fluctuations occur because the gain medium has the non-laminar flow component and nonuniform thermal and flow distributions. In medium and low power lasers the nonuniform thermal distribution, the components aging, the time variation of host temperature as in the case of YAG laser, the wall effect and many other causes result in the fluctuation and variation in the properties of the gain medium.

In the laser system of prior art, the necessity to enclose the gain medium between the cavity mirrors results in the requirement that the length of cavity be large enough to accomodate the size of the gain medium. In the gas lasers such as HeNe or argon, larger output power requires longer phasma tube. Also as in YAG laser, the optical pumping and cooling hardware require a considerable spacing between cavity mirrors.

In mode locked laser operation or a single axial mode operation, the length of the cavity is sometimes required to be smaller than the length of gain medium and consequently is not possible to implement in the prior art.

1.2 Invented Device

Figure 2:
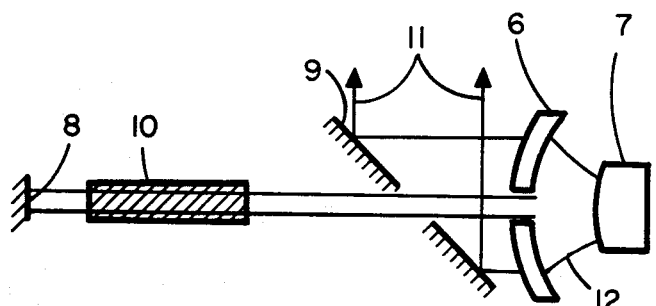
FIG. 2 is a basic configuration of the invented laser cavity.

FIG. 2 shows the features of the invented cavity. Mirrors 6 and 7 form a resonator cavity and coherent laser beam mode is established as photons bounce repetitively between them. Mirror 6 has a hole and the gain medium is optically coupled through said hole to said resonant cavity. Therefore, the photons leaking from said cavity through said hole is amplified by said gain medium 10, reflected by the reflecting mirror 8 and returned to said cavity. The curvature and size of mirrors 7 and 8 are such that a beam mode cannot be sustained between them along and independent of said cavity mirror 6.

In terms of ray optics, the resonant mode is an assemblage of those rays that start with a given position and direction, travel between the cavity mirrors, and return to the original position and direction; thus said ray reinforces itself and repeats the same process.

Figure 3:
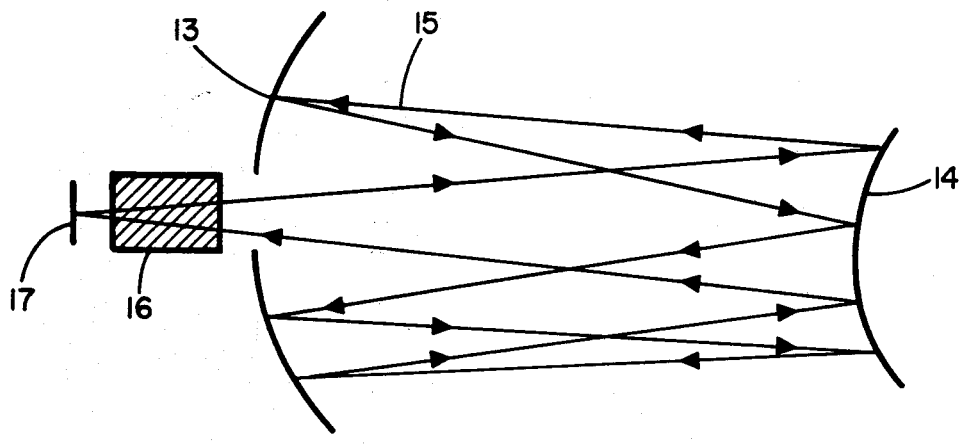
FIG. 3 is a typical ray bouncing among the cavity mirrors and the gain medium.

In FIG. 3 one such ray 15 is shown. As the ray bounces between mirrors 13 and 14 it passes through the hole, is amplified by the gain medium 16, reflected by mirror 17 and returns to the cavity to continue the travel. Therefore, this ray grows each time it makes the complete trip, and the final steady state amplitude is reached when the power gain equals the output power and internal loss. The same explanation is valid when mirror 13 and 14 form an unstable resonator if one remembers that even though the geometric ray walks away from the cavity the energy diffracts at each reflection and a part of diffracted energy returns to the initial ray condition; therefore the self enhancing repetitive process occurs.

In another point of view, the wavefront in the hole region can be expressed as a sum of orthonormal functions, which are called modes, over the surface of mirror 6, and the modes with small diffraction loss will survive as the beam bounces within the resonator.

When the size of hole is small compared with the size of mirror 6, the beam mode characteristics are determined primarily by mirror 6 and the random disturbance within the hole region does not affect the beam mode characteristics appreciably. Therefore, the laser beam is nearly insensitive to the random fluctuation and inhomogeneity in the gain medium and to the distortion of mirror 7; and as long as the geometry of mirrors 6 and 7 are held stable, the resulting beam characteristics are stable and predictable. The beam quality is thus improved because the random variation in phase and amplitude is reduced.

It is instructive to compare the cavity of prior art shown in FIG. 1 and the invented device shown in FIG. 2. In FIG. 1, the random fluctuations are introduced by the gain medium 3 across the entire span of beam lateral dimension; whereas in FIG. 2, the beam wavefront travels mostly a benign air except in the hole region which is a small portion of the beam lateral dimension.

The selection process of transverse modes in the proposed configuration is the same as that of the conventional laser configuration: Namely, the mode with smaller diffraction loss are sustained, provided that a sufficient gain is present.

Figure 4:
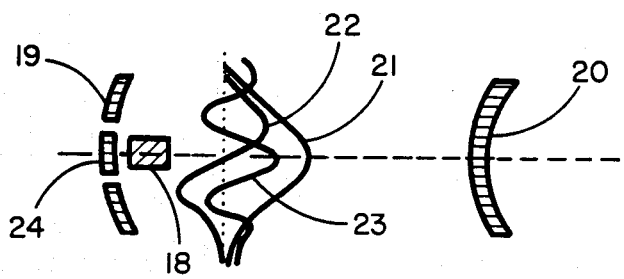
FIG. 4 is a simplified configuration of the invented laser cavity and the growth mechanism of each resonant mode.

In addition, the invented device has a strong tendency to oscillate predominantly in the fundamental mode. For the purpose of analyses the proposed configuration is represented by a simplified cavity structure shown in FIG. 4, where the gain medium 18 is located at the hole next to the reflector mirror 24. When the fundamental mode 21 arrives at the mirror surfaces 19, 24, its peak amplitude meets the gain and it receives a large amplification. When the next transverse mode, which is an odd mode 22, arrives at the mirrors 19, 24, its amplitude is near zero at the location of gain medium 18, thus receiving little amplification. In similar fashion, all the odd modes receive little amplification and eventually die out. The higher order even modes 23, have the peak amplitudes are less than that of fundamental mode and they have larger diffraction loss. Therefore, the net result is that the fundamental mode receives major share of the gain and higher order even modes receive small portion of it. Consequently, the beam mode oscillates substantially in the fundamental mode, and these characteristics are illustrated later in Section 3.

The techniques to siphon out the resonator beam mode are not the part of this disclosure but are mentioned for the sake of completeness. FIG. 2 shows the usual method in which mirror 6 is coated for a partial transmission and the transmitted beam is collimated by the curvature of uncoated surface of mirror 6 and eventually diverted by a folding mirror 9. In the case of high power lasers, the mirror 6 may have a non-linear (quadratic) grating, or a hole plate which is a reflector plate having a random array of holes can be employed.

The invented device, which is henceforth called the Hole Interfaced Cavity, is applied to the laser pointing system, mode locked laser, and single axial mode operation of laser as described in the following sections.

2. LASER POINTING SYSTEM

2.1 Prior Art

Figure 5:
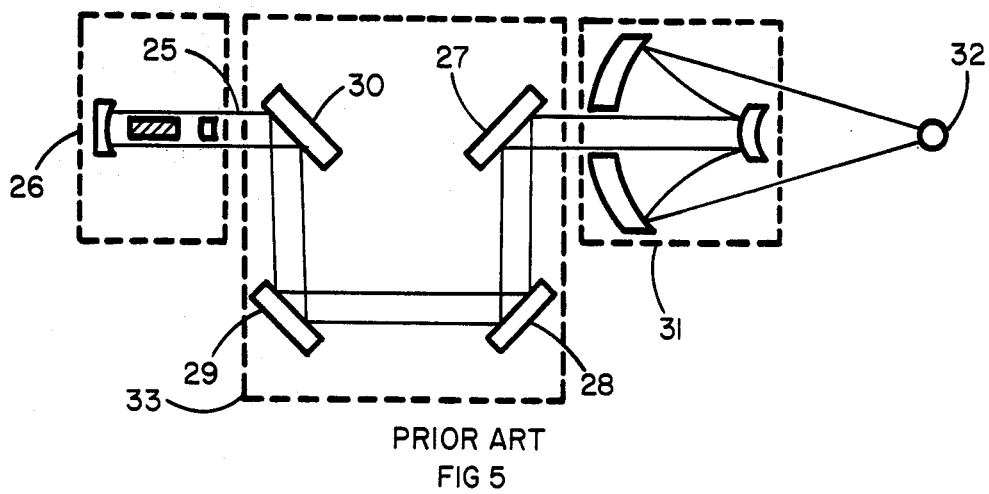
FIG. 5 is a typical laser pointing system.

In the present laser pointing system the laser beam 25 is transmitted from the laser 26 through a number of relay mirrors 27, 28, 29, and 30 to a beam expander 31 which focuses the beam at a distant object 32, as shown in FIG. 5. In this configuration, a precise alignment is necessary between the laser device 26 and relay optics bench 33, relay optics 33 and beam expander 31, and among optical elements 27, 28, 29, and 30 within the relay optics. Drift of the alignment and vibration of any component within this optical train directly affect the output beam of the beam expander 31.

2.2 Pointing Means of Laser Beam

When the Hole Interface Cavity principle is applied to a pointing, means that focuses the laser beam at a finite distance the output beam characteristics of such pointing are less sensitive to the vibrational jitter and misalignment of relay optics, laser device optics and beam expander than those of prior art.

Also, the output beam characteristics of said pointing means are more coherent, predictable and controllable because they are less sensitive to the random fluctuation of a laser gain medium properties than those of prior art.

Figure 6:
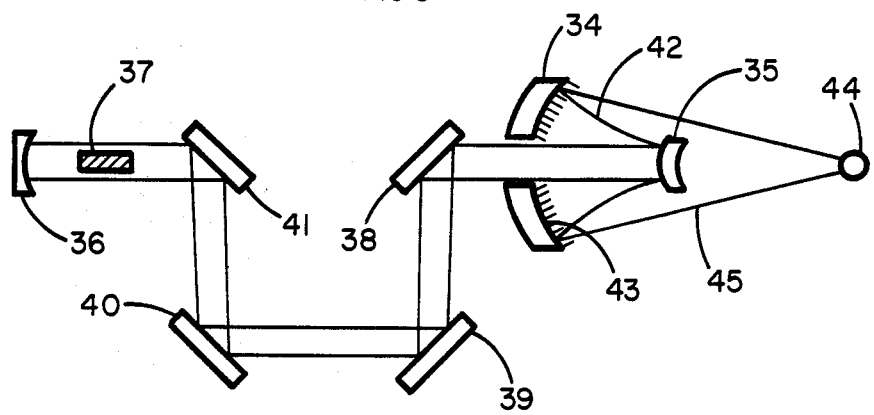
FIG. 6 is a typical configuration of the invented laser pointing system.

Referring to FIG. 6, the laser resonator is formed by mirrors 34, and 35. The laser gain medium is coupled to the resonator by mirror 35 through the relay optics mirrors 38, 39, 40 and 41 and the hole in mirror 34. The energy of beam mode 42 can be siphoned out to the output beam 45 by a number of ways currently available: One is the use of reflector having holes randomly distributed on it, or another is to put a quadratic grating on it. FIG. 6 shows 34 having a quadratic grating on it.

The cavity geometry of mirrors 34 and 35 is such that the resonance of the beam wave occurs over the entire surfaces of 34 and 35, which includes the hole region. Thus, the laser beam mode is primarily determined by the cavity formed by mirrors 34 and 35, and the active medium 37 supplies the power gain to sustain the laser oscillation. To be exact, the mode shape will be distorted by the presence of the hole on surface 34, which introduces the gain, disturbance, and misalignment of relay optics. These distortions have small effect of the total resonator behavior when the size of the hole is small compared with the dimension of mirror 34.

Figure 7:
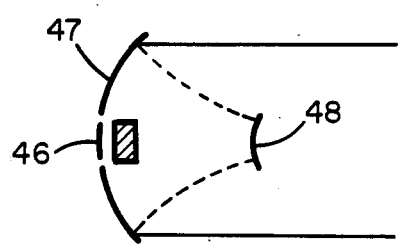
FIG. 7 is the equivalent cavity structure of that of FIG. 6.

For the sake of conceptual simplicity, an equivalent of FIG. 6 can be drawn as shown in FIG. 7, where surface 46 is now tilted, defocused, translated and disturbed in the manner that simulates the misalignment and disturbance in the relay optics and active medium turbulence.

In another point of view, the amplitude and phase distributions in the surface 46 can be decomposed into infinite number of modes that match the boundary conditions at mirrors 47, 46 and 48. Of these modes, the ones that receive enough gain to offset the loss sustain the oscillation. The proposed system has inherently strong mode discrimination capability to reject higher order modes as mentioned in Section 3.

The medium within the Hole Interfaced Cavity is mostly a benign air except the hole region. This is in contrast to the cavity of prior art which is filled with the gain medium having turbulent and inhomogeneous properties, and these fluctuation affect the mode shape directly.

In addition, the proposed cavity can be mounted within the fine gimbal of said expander, far away from the vibration and noise sources associated with the laser pumping system; whereas the pointing means of prior art requires the cavity in the vicinity of laser pumping system.

The invented pointing means, therefore, is structurally and optically more stable, and the output beam characteristics of said pointing means are predictable and controllable. Since the Hole Interfaced Cavity is mounted within the beam expander gimbal, the control requirements are also reduced.

3. MATHEMATICAL SOLUTION AND DESIGN GUIDES

Figure 8:
FIG. 8 is an example of the invented cavity and is used to demonstrate the operational characteristics of the invented cavity.

The cavity structure shown in FIG. 8 is used to demonstrate the operational characteristics of the invented device and also to provide for the design guidelines.

The one dimensional strip cavity is solved by using Fox and Lee approach and Fresnel diffraction formulation as derived in Section 4. The surface 49 represents the 3 mm hole region and surface 50 excludes the said hole. Whenever a beam hits surface 49 it is multiplied by the gain, and the phase is distorted by the wavefront tilt, defocus, and translation to simulate the misalignments. Mirror 50 is a 2 cm passive mirror and mirror 51 is a 2 cm convex mirror having a radius of curvature equal to 20 meters; Consequently, the said resonator is slightly unstable. The cavity dimension was chosen so that the Fresnel approximation would hold the computer time be kept resonable.

RESONANCE MODE

Figure 9:
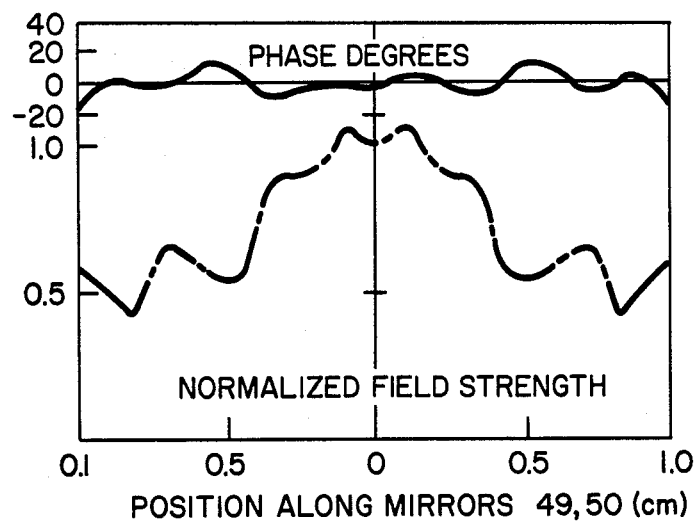
FIG. 9 shows the mode amplitude and phase of the cavity shown in FIG. 8 when no misalignment is present.

FIG. 9 shows the resonance mode when the gain medium supplies the gain and no misalignment is present. The mode volume can be made to fill the cavity more fully by reducing the radius of curvature of the mirror 51.

MODE SELECTION

Figure 10:
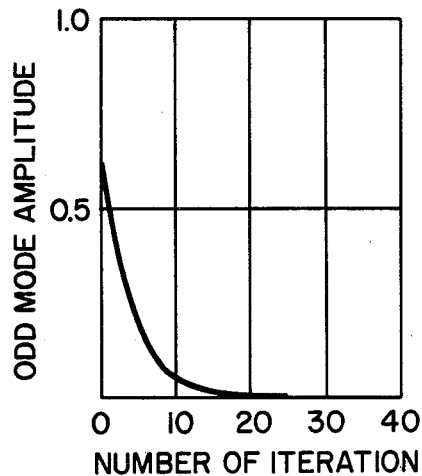
FIG. 10 shows that the odd modes decay rapidly in the invented cavity.

The said cavity has an inherent capability to reject the high order modes. Because the gain is concentrated in a small region at the center of the said cavity, all the odd modes have small amplitude in the gain region and thus receive small gain. Consequently, odd modes are severely attentuated as shown in FIG. 10.

Similarly, the higher even modes receive smaller gain compared with the fundamental mode because of their low amplitude at the gain region.

TILT

Figure 11:
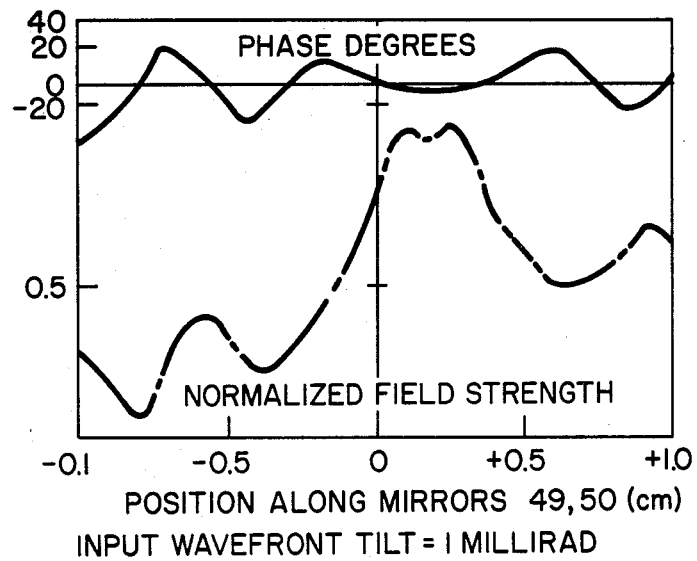
FIG. 11 shows the resonant mode when the mirror 49 of FIG. 8 is tilted.

When the surface 49 is tilted $57 \times 10^{-3}$ degrees (1 milliradian) the resulting output beam has the tilt of $1.4 \times 10^{-3}$ degrees as shown in FIG. 11. There is an inherent tilt attentuation by the corresponding beam expander and it is computed to be 0.1. Therefore, the tilt disturbance is attentuated by the said cavity resonance effected by a factor of 37.

The center of the output beam also shifts when tilt is introduced. Without the resonance effect, the shift is computed to be 2.1 mm. With the said resonator, the shift is 1.4 mm.

DEFOCUS

Figure 12:
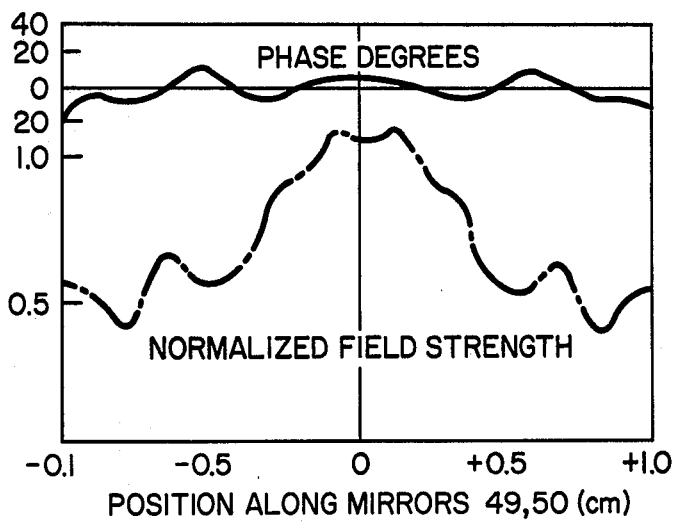
FIG. 12 shows the resonant mode when the mirror 49 of FIG. 8 has the focus error.

The surface 49 is defocused by introducing a radius of curvature of 5 meters to surface 49. The output beam shows no noticeable change, as shown in FIG. 12.

TRANSLATION

Figure 13:
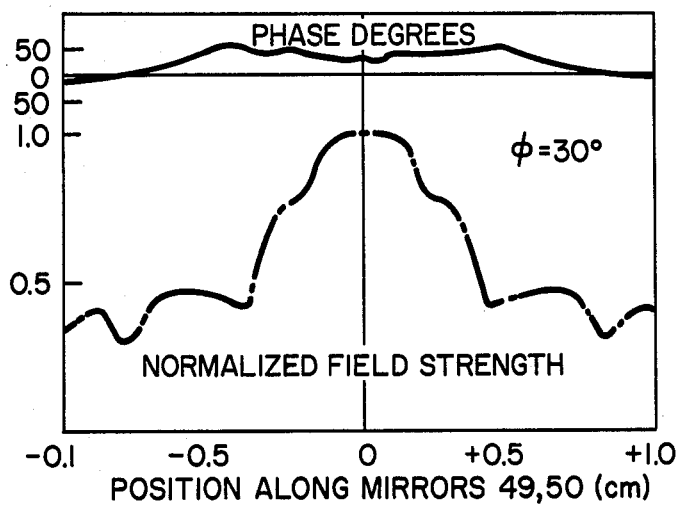

Surface 49 is translated by various amounts from surface 50 as shown in FIGS. 13 and 14. The phase distribution is nearly flat in region wherein the large portion of energy is present, and the phase distribution is disturbed by the edge effect near the edge region of surface 50 wherein a small portion of energy is present.

When surface 49 is displaced by $\pi/6$ radians (30°) the disturbance reaches to about 0.6 cm from the cavity axis, and a region of flat phase distribution appears beyond 0.6 cm toward the mirror edge where the edge disturbance is present, as shown in FIG. 13. When the translation of surface 49 is increased further to $\pi/3$ radian (60°), the phase disturbance of surface 49 and the edge disturbance of surface 50 begin to interact and the flat phase region starts to disappear, as shown in FIG. 14.

The uniform phase translation does not affect the laser beam quality. However, in cases wherein the translational disturbance cannot be tolerated, an auxiliary control shown in FIG. 15 can be used to hole the optical distance beween 52 and 53 within an acceptable limit. In FIG. 15, a Twyman Greene interferometer is used to measure the distance variation between 54 and 53 with test beam 57 through gain medium 58, and it is compensated by moving the corner cube 55 using feedback technique.

The said control system can be a coarse system because the major portion of phase translation effect is already reduced by the said hole interfaced cavity.

4. QUESTIONS AND CLARIFICATIONS

In order to facilitate the understanding of how the Hole Interfaced Cavity of this invention works, a list of questions and clarifications is presented.

Question: Ordinarily, when the laser cavity gets larger the parasitic local lasing occurs. Will the said Hole Interfaced Cavity suffer from the local lasing?

Figure 16:
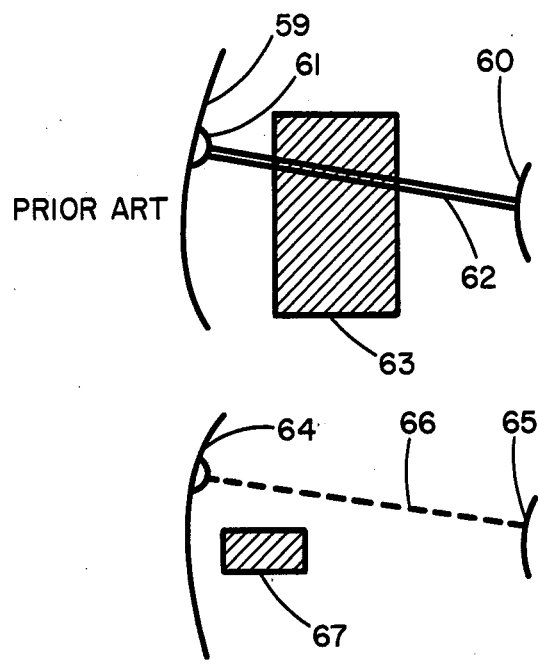
FIG. 16 illustrates that the invented cavity does not have the parasitic local lasting.

Answer: A typical cavity of prior art shown in FIG. 16 consists of mirrors 59, 60 and is filled with gain medium 63. Therefore, a small defect 61 on the mirror surface can readily start a local lasing. In the Hole Interfaced Cavity consisting of mirrors 64 and 65, the gain medium 67 is confined in the central region and the local lasing 66, cannot be sustained in regions where no gain is present.

Figure 17:
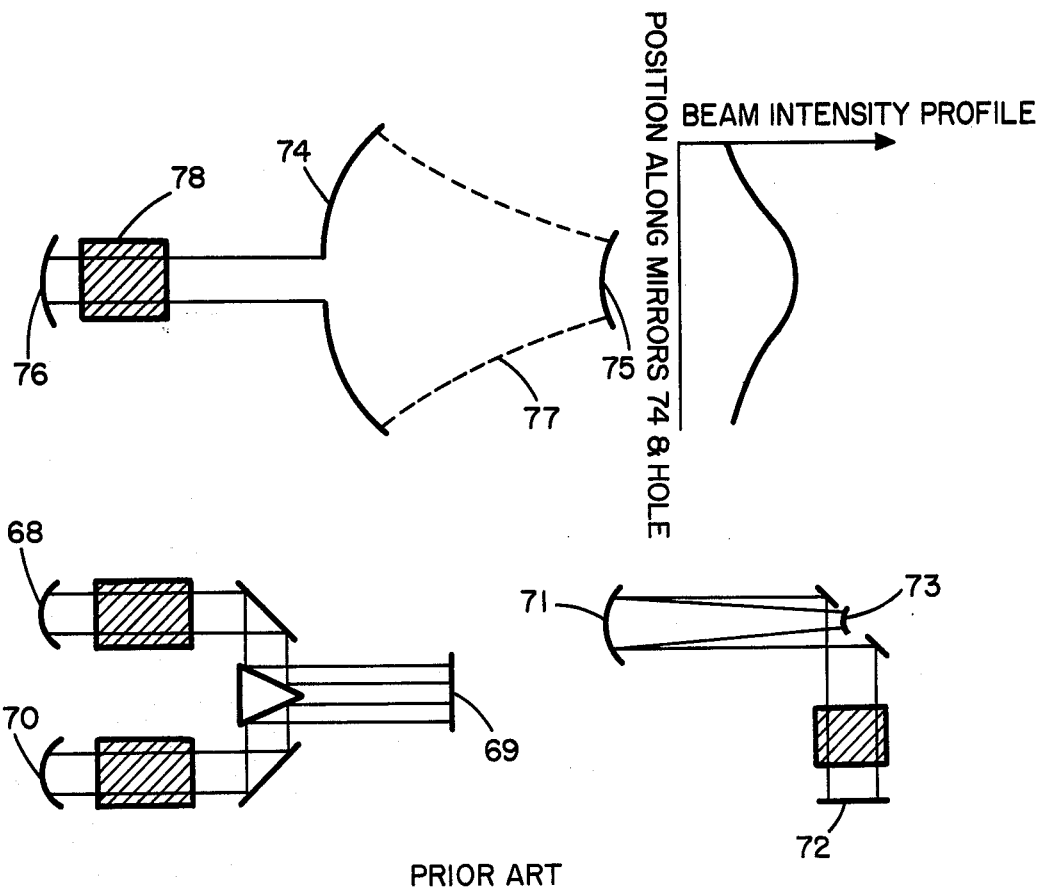
FIG. 17 illustrates that the mirror of FIG. 3 does not overheat in the invented cavity.

Question: In some cavity structures that are similar in appearance to said Hole Interfaced Cavity, as shown in FIG. 17, the small mirror gets hot. Will the small mirror 76 of the Hole Interfaced Cavity be heated hot?

Answer: The cavity structure consisting of mirrors 68, 69, and 70 and cavity consisting of mirrors 71, 72 in FIG. 17 are similar to the Hole Interfaced Cavity consisting of mirrors 74, 75, and 77 in appearance only and different in the principle of operation. In the cavity structures of prior art the total energy is concentrated on the small mirrors 69 and 73, and these mirrors consequently become hot. In the Hole Interfaced Cavity, a small portion of the total beam energy is present in the hole region and it reaches the small mirror 76 via gain medium 78. Therefore, the power impinged on the small mirror is not the concentration of total cavity power. Therefore, the small mirror of said Hole Interfaced Cavity is not as hot as that of the cavity of prior art.

Question: In an ordinary unstable resonator the directional error of output beam increases by 2×(number of beam bounces)×(cavity mirror tilt). This means that when the beam takes many bounces the cavity structure must be aligned with high accuracy. Would the said Hole Interfaced Cavity require the same degree of high precision alignment and stability?

Figure 18:
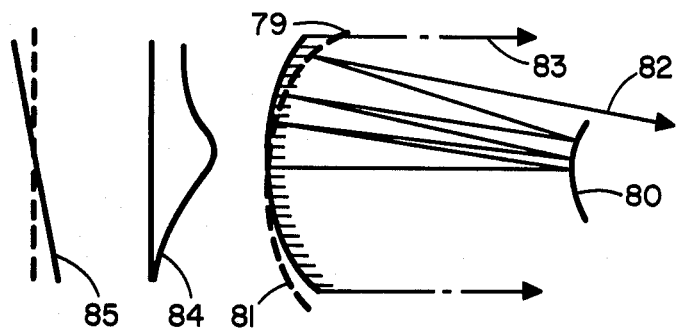
FIG. 18 illustrates that when the primary mirror 13 of FIG. 3 is tilted due to misalignment, the phase front tilt of the resulting resonant mode is on the order of the tilt of mirror 13.

Answer: In ordinary unstable cavity the output beam would have taken a multiple reflectin in the geometric ray sense like the ray 82 of FIG. 18. In the said Hole Interface Cavity of this invention, the output beam is obtained by siphoning energy from the cavity resonance mode with one of the well known energy siphoning devices such as the quadratic grating or the random hole plate. Thus, the method used to couple the beam out is fundamentally different in this invention. Consequently, the directional error of output beam 83 in the Hole Interfaced Cavity depends on the phase tilt 85 of the cavity mode 84 and not on the number of reflections the output beam takes. When the cavity mirror tilts as shown by 81, the phase distribution 85 of the mode 84 follows the mirror 79 and the directional error is approximately the tilt of the cavity mirror 79.

Question: In an ordinary cavity of prior art, as the lateral dimension of cavity mirror gets larger, higher order modes are excited. Wouldn't the Hole Interfaced Cavity of this invention excite higher order modes?

Answer: The cavity structure of this invention has the inherent property to suppress the higher order modes and excite predominantly the fundamental mode, as explained in FIG. 10 and Section 3.

Question: If a large portion of the mode energy (97% for instance) is siphoned out to the target, as would be the case with the cavity of this invention, would not the resulting resonator cavity be a low Q cavity and unable to filter out the incoming disturbance?

Figure 19:
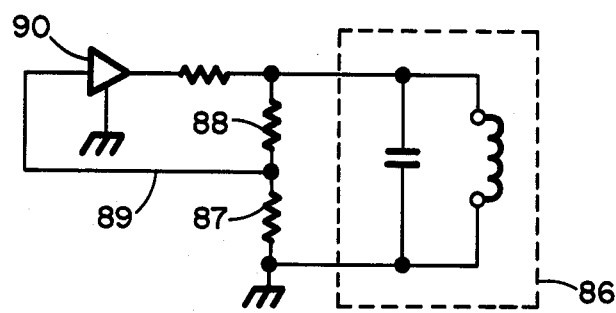
FIG. 19 shown the electronic analogy of the invented cavity.

Answer: Using the electronic circuit analogy shown in FIG. 19, it is true that when an LC resonator 86 is heavily loaded by 87 and 88, its Q goes down. However, if a part of resonator signal 89 is amplified by 90 via feedback circuit, Q of LC resonator 86 can be high in the presence of heavy loading. In the cavity of this invention, a portion of the resonance mode is fed back to the gain medium and amplified, and the Q of cavity remains high.

Question: What are the design guidelines when the hole size gets larger and what influence does it have on the cavity design?

Figure 20:
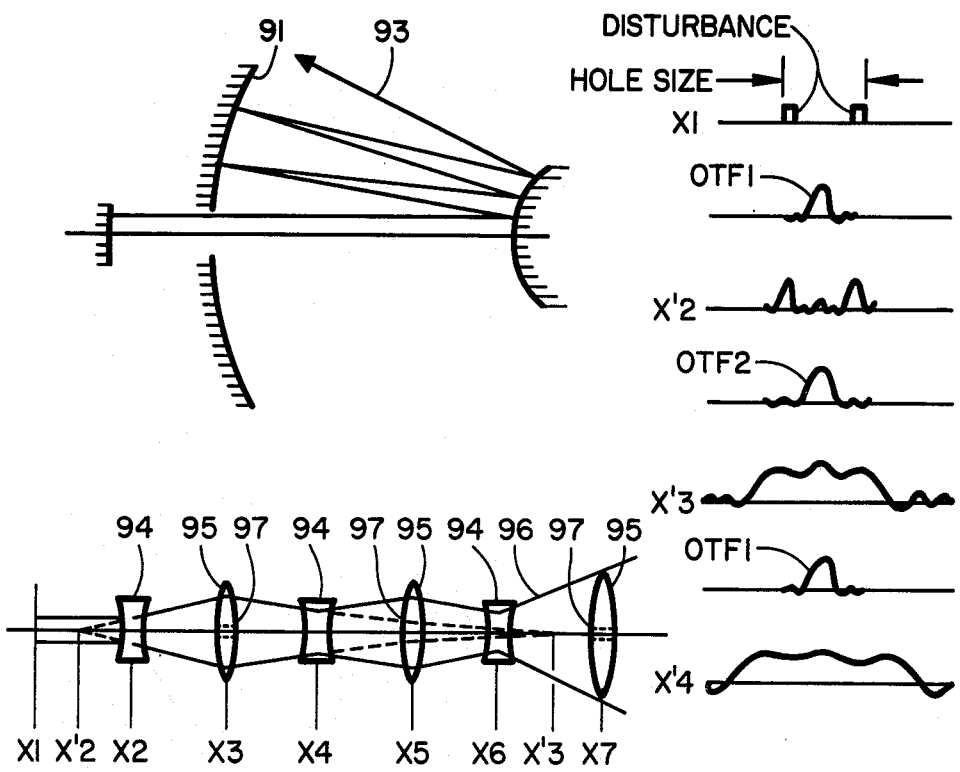
FIG. 20 shows another way of considering the cavity resonance in terms of a series of lenses.
Figure 21:
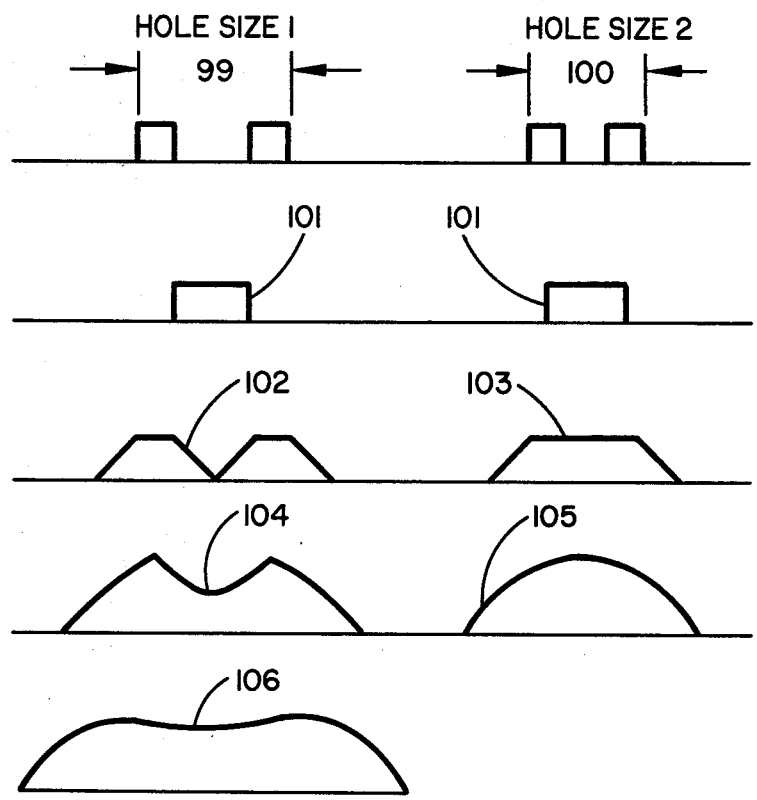
FIG. 21 illustrates that as the beam makes multiple bounces within the invented Hole Interfaced cavity the effect of disturbance in the region of hole is diminished.

Answer: The operation of the Hole Interfaced Cavity can be explained by an equivalent lens system shown in FIG. 20, wherein mirror 91 is represented by lens 95, and mirror 92 by lens 94, the hole region by 97, and beam 93 by beam 96. A disturbance in the hole region of X1 plan is imaged at plane X'2 by lens 94 which has the Optical Transfer Function (OTF). $OTF_1$ at X2 plane and this process can be represented by convolution of $OTF_1$ and the disturbance. The resulting image is imaged again by lens 95 whose Optical Transfer Function (OTF) is $OTF_2$, and this process represents the convolution of $OTF_2$. This process continues and each additional convolution process blurs the disturbance further. In a stable cavity where the beam is confined within the cavity, the beam passes an infinite number of lenses and nearly Gaussian beam profile results by the virtue of the central limit theorem. In an unstable cavity, the beam passes through a finite number of lenses and the attentuation of disturbance increases with the number of lenses the beam passes. $OTF_2$ is a combination of lens aperture OTF and hole area OTF. Since the hole size is smaller than the lens aperture, the hole OTF is spread wider than the lens aperture OTF; and when convolved with an image, the narrow and sharp lens OTF is dominant over the hole OTF which is spread wide. Relative sizes of hole 98 and mirror 91 determined how rapidly the disturbance in the hole region is attentuated with the number of beam bounces, as illustrated in FIG. 21. The hole size 1 where disturbance 99 is present is larger then the hole size 2 where disturbance 100 is present.

Convolution of disturbances 99 and 100 with a function 101, which is an approximation of a lens OTF, results in 102 and 103 respectively. Similarly, the convolution of 102 and 103 with 101 results in 104 and 105 respectively, and this process can be continued. Comparison of 104 and 105 shows that the smaller hole, namely the hole size 2, loses the trace of disturbance 100 faster than the hole size 1. Therefore, the relative sizes of hole and lens aperture become a parameter to signify the effect of hole region on the entire cavity mode shape. In actual design, three parameters can be traded off: the cavity mirror size, the hole size and the number of bounces the beam takes in the cavity. To increase the attenuation of the disturbance in hole region, the hole size should be as small as practical compared with the cavity mirror size or the number of beam bounces should be increased or both. On the other hand, as the number of beam bounce increases the cavity approaches to a stable cavity and the moe shape becomes sensitive to the mirror curvature.

In a specific design, compromises are needed among these parameters to meet the design goal.

Question: When the Fresnel number of the cavity is large, is the Frensel diffraction formulation not valid?

Figure 22:
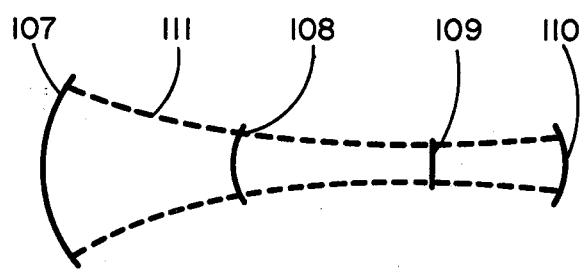
FIG. 22 shows different cavity geometrics having the same Fresnel number.

Answer: It is true and the formulation should be modified for such cavities. The fact that a different mathematical technique is needed does not mean that the physical phenomena change suddenly at a certain Frensel number. Also, Fresnel number does not determine the cavity behavior completely as illustrated in FIG. 22 and should be used with caution when characterizing the cavity. In the case of the stable resonator where mirrors match the phase of the beam mode, the cavity consisting of 107 and 108 has larger Fresnel numbers than cavity consisting of 107 and 109 and yet both have the same mode characteristics. In cavity design, the mirror curvature is an important parameter, and yet Fresnel number does not contain the mirror curvature information.

Figure 23:
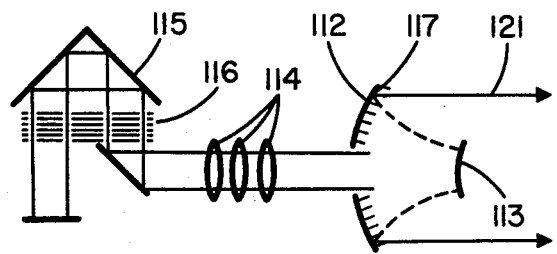
FIG. 23 shows two approaches to implement the invented Hole Interfaced Cavity.
Figure 23:
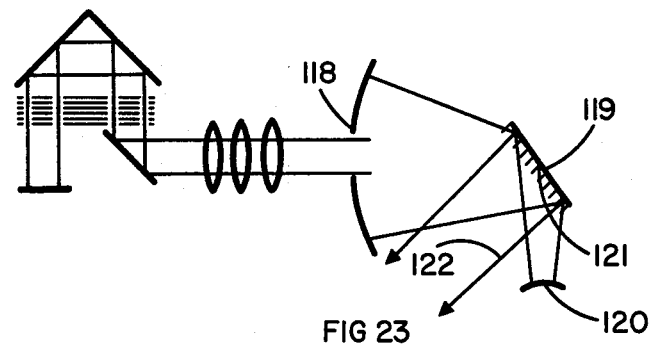

There are two approaches to implement the Hole Interface Cavity as shown in FIG. 23. The cavity consisting of mirrors 112 and 113 is the case of large Fresnel number, wherein the relay optics 114, gain medium 116, roof mirror 115, and quadratic grating 117 contribute to production of output beam 121 in a laser pointing means. The cavity consisting of mirrors 118, 119 and 120 is the case of smaller Fresnel number, wherein the mirror 119 has a quadratic grating 121 which siphons out the output beam 122.

Figure 24:
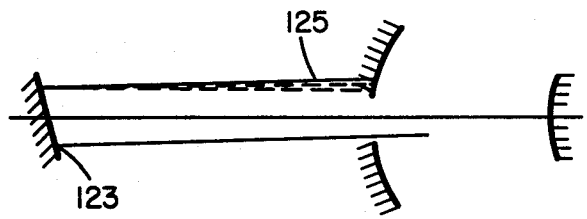
FIG. 24 shows an approach which reduces the energy loss due to the tilt of mirror 17 of FIG. 3.
Figure 24:
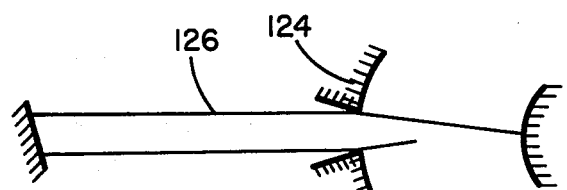

Question: The hole may not recover the total beam energy returning from the gain medium because of the reflector tilt 124 or divergence of returning beam, as shown in FIG. 24 wherein the beam spill over 125 is energy loss.

Answer: In uncommon situations where the energy spill over 125 of the returning beam in the hole is not tolerable, a light funnel 124 shown in FIG. 24 can be used to guide the returning beam to the cavity. The angle between the returning beam 126 and the funnel 124 is usually very small, and the effect on the Hole Interface Cavity is that the disturbance in hole region has additional disturbance component originating from the funnel, which is small when the angle between beam 126 and funnel 124 is small.

Question: In most inventions, advantages are accompanied by disadvantages. What are the disadvantages?

Answer: The Hole Interface Cavity requires an oversized cavity mirror. This is not a problem for laser pointing device however, because a large mirror is already available in the form of beam expander optics. This technique also requires a means of coupling the beam energy out to the target. The available methods include quadratic grating or random hole plate.

5. MODE-LOCKED OPERATION AND SINGLE AXIAL MODE OPERATION WHEN THE SIZE OF GAIN MEDIUM IS LARGE

Hole Interfaced Cavity disclosed in this invention can be used to achieve the mode-locked operation and also the single axial mode operation when the size of gain medium is large.

The mode-locked laser operation is often considered in the areas of laser communication, laser fusion and other ordinary commercial applications. In mode-locked laser the basic parameter is the separation of axial mode frequencies, which is determined by the relationship, $$\Delta f = (c/2L)$$

where
c is the speed of light
L is the effective length of cavity
$\Delta f$ is the frequency separation between the adjacent axial modes The higher mode-locked frequency requires shorter effective cavity length. On the other hand, the larger laser power required a longer plasma tube in gas lasers or a larger pumping fixture in solid state lasers, and consequently requires a longer effective cavity in the prior art.

These two conflicting requirements can be satisfied when the techniques of the Hole Interface Cavity disclosed in this invention is used, provided that the line width of atomic transition is sufficiently large.

In laser communication, for example, higher data rate with larger laser output power is a desirable characteristic.

Figure 25:
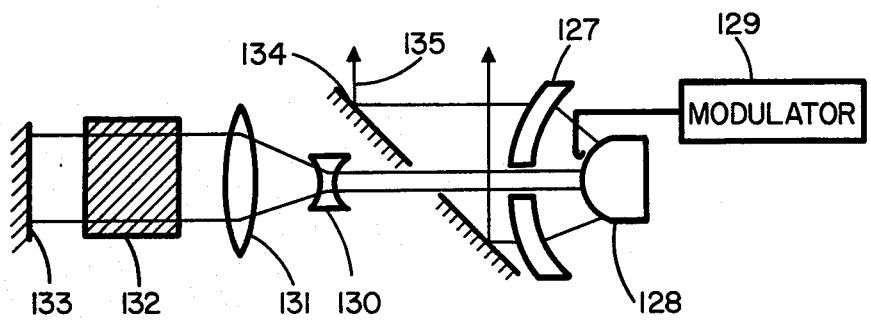
FIG. 25 shows a mode-locked laser using the hole interfaced cavity.

In FIG. 25, mirrors 127 and 128 form the Hole Interface Cavity, and electronic modulator 129 provides the periodic perturbation whose frequency is the same as that of the axial mode separation of the Hole Interfaced Cavity. In this device, the gain medium can be constructed as large as required whereas the effective cavity length remains the same.

Lenses 130 and 131 form a beam expander so that the photons leaking through the hole is expanded to cover the lateral dimension of the gain medium 132, the mirror 133 returns the photons back to the cavity. The beam mode energy is partially coupled out through the partial transmission of mirror 127 and diverted by mirror 134.

The single axial mode operation is required in some interferometric measurements in which laser oscillation of a single frequency is necessary. In this case, the effective cavity length should be short enough to allow only one axial mode within the line width of atomic transition. The short cavity length and a large laser power can be realized if the Hole Interface Cavity technique of this invention is applied.

Figure 26:
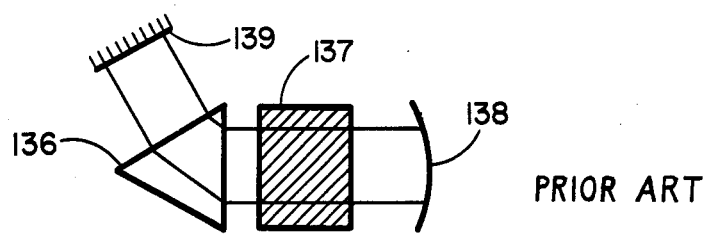
FIG. 26 shows a single axial mode cavity of prior act.

The technique practiced in the prior art as shown in FIG. 26, wherein the frequency selective element such as a prism 136 and gain medium 137 are enclosed within a cavity of 139 and 138, has the disadvantage of being affected by the random drift and fluctuation of the gain medium when the gain medium size is large for high power.

Figure 27:
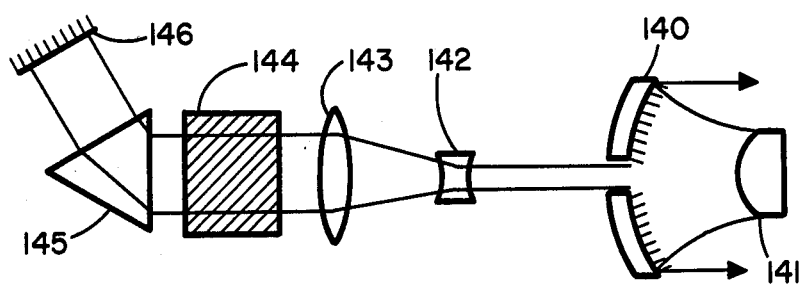
FIG. 27 shows a single axial mode cavity using the Hole Interfaced Cavity.

The device shown in FIG. 27 has the Hole Interfaced Cavity consisting of mirrors 140 and 141, beam expander consisting of lenses 142 and 143, gain medium 144, a frequency selective device, namely a prism 145 for instance, and reflector mirror 146.

Because of the short effective cavity length of the Hole Interfaced Cavity, the device shown in FIG. 27 produces a single axial mode laser beam having stable frequency, stable mode shape and narrow bandwidth consistent with the Q of cavity.

6. MATHEMATICAL SOLUTION OF THE HOLE COUPLED CAVITY

The characteristics of the Hole Coupled Cavity are demonstrated with the solutions of mathematical formulation presented in this section.

Figure 28:
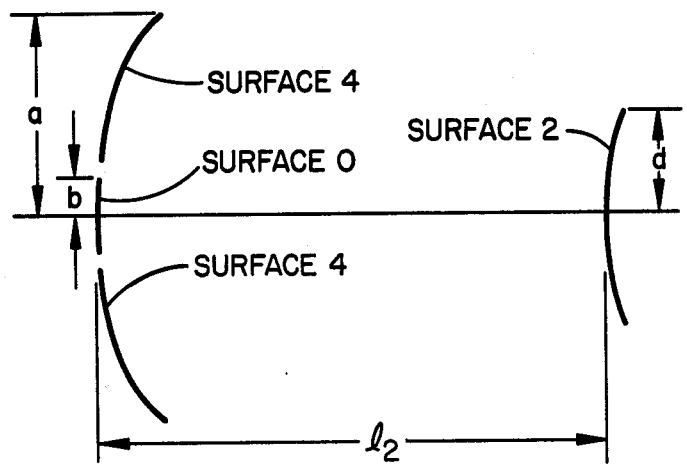
FIG. 28 shows the cavity geometry used to derive the mathematical analyses.

Using Huygen's principle and Fresnel diffraction formulation, we consider an infinite strip cavity shown in FIG. 28.

The wave propagation from surface 2 to surface 4 is, $$f_4(x_4) = A\sqrt{1-\tau_4}\, \exp[i\alpha_4 x_4^2] \int_{\xi\,=\,R_2} f_2(\xi)\exp\left[ik\frac{(x_4-\xi)^2}{2l_2}\right]d\xi \quad (1)$$

where
$k = 2\pi/\lambda$
$f_i(x_i)$ is the field distribution on i-th surface
$\alpha_i$ represents the curvature of i-th surface
$A = \exp[ikl_2]/\sqrt{\lambda l_2}$
$R_i$ represents the area of i-th surface
$\tau_i$ represents the power diversion to the target from i-th surface Similarly, the propagation from surface 2 to surface 0 is given by, $$f_0(x_0) = A\, G\, \exp[i(\phi_0 + \phi_1 x_0 + \phi_2 x_0^2)] \int_{\zeta\,=\,R_2} f_2(\zeta)\exp\left[ik\frac{(x_0-\zeta)^2}{2l_2}\right]d\zeta \quad (2)$$

where
$G$ is the active medium gain
$\phi_1$ is the translational disturbance
$\phi_1$ is the tilt disturbance
$\phi_2$ is the defocus disturbance The field reaching surface #2 is given by $$f_2(x_2) = \sqrt{A(1-\tau_2)}\, \exp[i\alpha_2 x_2^2]\left\{\int_{x_4\,=\,R_4} f_4(x_4)\exp\left[ik\frac{(x_2-x_4)^2}{2l_2}\right]dx_4 + \int_{x_0\,=\,R_0} F_0(x_0)\exp\left[ik\frac{(x_2-x_0)^2}{2l_2}\right]dx_2\right\} \quad (3)$$

When there is no tilt disturbance, the field equations can be decomposed into even and odd modes. Even modes are, $$f_4^{(e)}(x_4) = A\sqrt{1-\tau_4}\, \exp\left[i(\alpha_4 + \frac{k}{2l_2})x_4^2\right]\int_0^d f_2^{(e)}(\xi)\cos(\frac{kx_4}{l_2}\xi)\cdot\exp\left[ik\frac{\xi^2}{2l_2}\right]d\xi \quad (4)$$

where,
$f_i^{(e)}(x_i)$ is the even mode field distribution on the i-th surface $A = 2\exp[ikl_2]/\sqrt{\lambda l_2}$ Similarly, $$f_0^{(e)}(x_0) = A\, G\, \exp\left[i(\phi_0 + \phi_2 x_0^2 + \frac{k}{2l_2}x_0^2)\right] \quad (5)$$

$$\int_0^d f_2^{(e)}(\zeta)\cos(\frac{kx_0}{l_2}\zeta)\exp\left[i\frac{k\zeta^2}{2l_2}\right]d\zeta$$

$$f_2^{(e)}(x_2) = A\sqrt{(1-\tau_2)}\, \exp\left[i(\alpha + \frac{K}{2l_2})x_2^2\right] \quad (6)$$

$$\left\{\int_b^a f_4^{(e)}(x_4)\cos(\frac{kx_2}{l_2}x_4)\exp[ikx_4^2/2l_2]\,dx_4 + \int_0^b f_0^{(e)}(x_0)\cos(kx_2 x_0/l_2)\exp[ikx_4^2/2l_2]\,dx_0\right\}$$

Odd modes are, $$f_4^{(0)}(x_4) = B\sqrt{1-\tau_4}\, \exp\left[i(\alpha_4 + \frac{k}{2l_2})x_4^2\right]\int_0^d f_2^{(0)}(\xi) \quad (7)$$

$$\sin(kx_4\xi/l_2)\exp\left[i\frac{k\xi^2}{2l_2}\right]d\xi$$

where $B = 2\exp\left[i(kl_2 - \frac{\pi}{2})\right]/\sqrt{\lambda l_2}$ $f_i^{(0)}(x_i)$ is the odd mode field distribution on i-th surface $$f_0^{(0)}(x_0) = B\, G\, \exp\left[i(\phi_0 + \phi_2 x_0^2 + \frac{k}{2l_2}x_0^2)\right] \quad (8)$$

$$\int_0^d f_2^{(0)}(\zeta)\sin(kx_0\zeta/l_2)\exp\left[ik\frac{\zeta^2}{2l_2}\right]d\zeta$$

$$f_2^{(0)}(x_2) = B\sqrt{1-\tau_2}\, \exp\left[i(\alpha_2 + \frac{k}{2l_2}x_2^2)\right]$$

$$\left\{\int_b^a f_4^{(0)}(x_4)\sin(kx_2 x_4/l_2)\exp\left[ik\frac{x_4^2}{2l_2}\right]dx_4 \right.$$

$$\left. + \int_0^b f_0^{(0)}(x_0)\sin(kx_2 x_0/l_2)\exp\left[ik\frac{x_0^2}{2l_2}\right]dx_0\right\} \quad (9)$$

The even modes are computed by using Equations (4), (5), and (6), and odd modes by Equations (7), (8), and (9). When tilt is present, the general solutions are botained by using Equations (1), (2), and (3).

What is claimed is:

1. A laser cavity which comprises two cavity mirrors wherein one has a hole, a laser gain medium located external to the said cavity collinear to the position of said hole, a relaying optical means located between said cavity and said laser gain medium, a reflecting mirror located collinear to said hole and said gain medium and located beyond the said gain medium from the said hole and an energy "siphoning means to output a part of cavity mode energy, and wherein the curvatures of the said cavity mirrors are such as to form a resonator cavity, and the curvatures of said cavity mirror without hole and reflecting mirror are such that no laser oscillation is sustainable between them alone for said gain medium.

2. The invention as stated in claim 1, wherein said energy siphoning means comprises a partial transmission coating on said cavity mirror with hole, and a steering mirror with a hole positioned collinear to said hole of said cavity mirror with hole and outside said cavity adjacent to said cavity mirror with hole.

3. The invention as stated in claim 1, wherein said energy siphoning means comprises a partial transmission coating on said cavity mirror without hole.

4. The invention as stated in claim 1, wherein said relaying optical means is a beam expander.

5. The invention are stated in claim 1, wherein said relaying optical means is a set of relay mirrors.

6. The invention as stated in claim 1, wherein said energy siphoning means is a quadratic grating ruled on said cavity mirror with hole.

7. The invention as stated in claim 1 wherein said energy siphoning means is a plurality of randomly distributed small holes on said cavity mirror without hole.

8. The invention as stated in claim 1, including feedback control means comprising an interferometer for measuring the optical distance between said hole and said reflecting mirror, and plurality of actuators which push or pull said reflecting mirror.

9. The invention as stated in claim 1, including an electrooptic modulator located within said cavity, an electronic oscillator which excites said modulator with frequency of oscillation equal to the difference frequency between the adjacent longitudinal modes.

10. The invention as stated in claim 1, wherein said cavity length is so small as to allow one single longitudinal mode oscillation, and including a frequency selective device which is located between said gain medium and said reflecting mirror.

11. The invention as stated in claim 1, wherein a light funnel is attached to said hole on the side of said cavity mirror with hole which faces said gain medium.

* * * * *